United States Patent [19]

Neuhaus

[11] Patent Number: 4,865,437

[45] Date of Patent: Sep. 12, 1989

[54] EYEGLASS FRAME WITH SNAP-FIT TEMPLES

[76] Inventor: Karl-Hermann Neuhaus, Pommern Strasse 15, D-4030 Ratingen 1, Fed. Rep. of Germany

[21] Appl. No.: 111,445

[22] Filed: Oct. 21, 1987

[30] Foreign Application Priority Data

Oct. 22, 1986 [DE] Fed. Rep. of Germany ....... 3635891

[51] Int. Cl.$^4$ .............................................. G02C 5/14
[52] U.S. Cl. .................................... 351/116; 351/121
[58] Field of Search ................ 351/156, 157, 41, 111, 351/118, 47, 121, 116; 2/450, 442, 443

[56] References Cited

U.S. PATENT DOCUMENTS 2,426,266  8/1947  Haas ........................................ 2/450
4,154,513  5/1979  Goulden ................................. 351/47
4,479,703  10/1984  Enghofer ......................... 351/156 X
4,657,364  4/1987  Murrell ............................. 351/156

Primary Examiner—Rodney B. Bovernick
Attorney, Agent, or Firm—Becker & Becker, Inc.

[57] ABSTRACT

An eyeglass frame, especially for sport glasses, including a central portion for accommodating the lenses, as well as temple pieces that can be detached from the central portion. Each temple piece can be inserted through a hole or slot that is provided in each side region of the central portion. One end of each temple piece is provided with a widened portion that is adapted to come to rest against the central portion in the vicinity of a given hole or slot thereof. The entire length of each temple piece is adapted to be guided through a given hole or slot.

14 Claims, 2 Drawing Sheets

EYEGLASS FRAME WITH SNAP-FIT TEMPLES

BACKGROUND OF THE INVENTION

The present invention relates to an eyeglass frame, especially for sport glasses. The frame includes a central portion (the frame proper) for accommodating lenses, as well as sidepieces or temple pieces that can be detached from the central portion of the frame. Each temple piece can be inserted through a receiving means, in the form of a respective hole or slot, provided in each side region of the central frame portion U.S. Pat. No. 4,564,272, Kan dated Jan. 14, 1986 describes frame-less glasses having lenses where the central portion is formed by the lenses themselves. Located in the side regions of the central portion are holes through which the ends of removable temple pieces can be inserted. To secure a temple piece, a socket is provided on the other side of the lens to secure the end of the temple piece that was inserted through an opening in the lens. As an alternative, U.S. Pat. NO. 4,564,272 Kan dated Jan. 14, 1986 proposes providing the end of the temple piece with two pins that extend radially out of the end of the temple piece and that can be inserted through the central portion along with the temple piece end, which has a circular cross-sectional shape. To secure the temple piece to the central portion, the temple piece is rotated by 90 degrees. So that the temple piece can be pivoted in a direction toward the central portion, it was further proposed to provide a flexible hinge at that end of the temple pieces closest to the central portion. The just-described, heretofore known glasses have the drawback that during torsional stress, such as can be encountered during athletics when a ball strikes the glasses, the latter are too likely to break; in particular, the central portion can easily break in the region of the holes, thus representing a tremendous danger of damage to the eyes.

U.S. Pat. No. 4,056 853 Battazzini et al Nov. 8. 1987 discloses an eyeglass frame that is with slot-like holes in the side regions of the central portion. An elongated shaft member having a perpendicularly angled-off lip 12, which serves as an abutment for resting against the central portion, can be inserted through one of these holes. This shaft member is furthermore provided with two rib-like elevations for arresting the respective eyeglass. However, the shaft member serves merely for rapid replacement and securing of the eyeglasses.

It is an object of the present invention to provide an eyeglass frame, especially for sport glasses, that has a simple construction, is break-resistant due to this construction, and permits an easy pivoting or movement of the temple pieces onto or against the central portion to provide a folded-up state.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
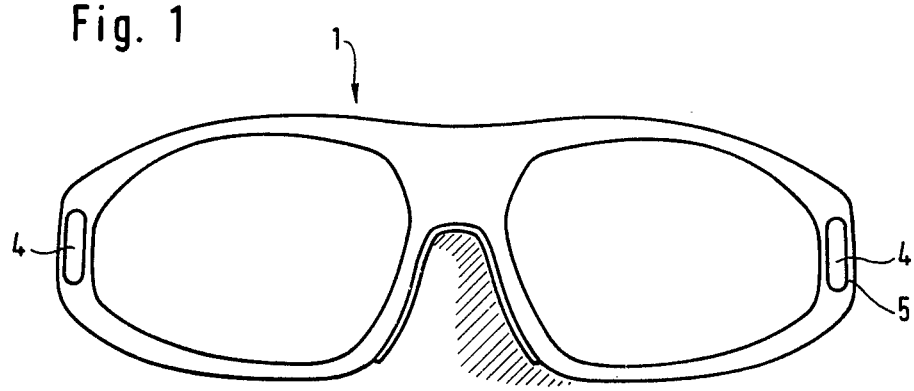
FIG. 1 is a front view of the central portion of one exemplary embodiment of the inventive eyeglass frame.

The eyeglass frames of the present invention are characterized primarily in that those ends of the temple pieces that come to rest against the central portion are each provided with a widened portion that either comes to rest loosely against an appropriately shaped edge surface that extends around the hole or slot, or that can snap into groove-like recesses of the hole or slot; furthermore, the entire length of each temple piece is adapted to be guided through the hole or slot.

The primary characterizing feature of the inventive eyeglass frame is that it is possible to secure the temple pieces to the central portion, without utilizing a conventional metal hinge. Starting from a folded-up state, the eyeglasses can easily be transformed into a state for wearing by introducing those ends of the temple pieces that fit about the ears into the holes or slots provided in the central portion, with the entire length of the temple pieces being guided through the holes or slots until finally the widened portions at the other ends of the temple pieces come to rest loosely against the edges that extend around the hole or slot.

The inventive glasses are particularly easy to operate if those ends of the temple pieces that fit about the ears are connected or connectable to a flexible, one or two-piece carrying or support band or strap. If the glasses are equipped with such a strap, the user pulls the strap only briefly away from the central portion, as a result of which the ends of the temple pieces slide into the holes or slots provided in the central frame portion, and when the flexible strap is pulled further away from the central portion the entire length of the temple pieces is pulled through these slots or holes until finally the widened portions come to rest against the central frame portion.

The temple pieces are preferably essentially rigid.

The widened portion at the end of a given temple piece can have different shapes, with the only criteria being that the pertaining end of the temple piece not slide through the hole or slot of the central frame portion. Examples of widened portion shapes that are economical to manufacture are spherical or elongated oval shapes with a greater width than the width of the slot and the remainder of the temple piece.

Pursuant to a further embodiment of the present invention, each of the holes or slots is provided within the central portion with a reinforcement that has a ring-like or elongated oval shape, and is made of a material that is harder than the central frame portion. Although this reinforcement allows the temple piece to slide through with as little friction as possible, it forms a stable abutment that prevents the widened portion at the end of the temple piece from also sliding through the hole or slot when the temple piece is pulled very hard, which results in a slight expansion of the hole or slot.

Preferably, that side of the hole or slot in the central frame portion that faces the eyes of the wearer is conically enlarged, as a result of which, in the folded-out state, the temple pieces can be adjusted in conformity to the width of the head.

In order to prevent the central frame portion from breaking or tearing in the region of the holes or slots, this region should have a slight elasticity that is adapted to the anticipated tensions.

For sport glasses, it is advisable to have a two-part, and preferably flexible, support strap, with the parts of the strap being provided with one or more securing means in order to connect them together. The strap parts can be even be cast or otherwise integrally formed with those ends of the temple pieces that fit over the ears. Examples of securing means include push-buttons, snap fasteners, clips, and Velcro-type and other adhesion closures that, by being suitably distributed over the parts of the strap permit variable adjustment of the length of the strap. Pursuant to a preferred embodiment, the support strap has a length that is sufficient to allow the glasses to be hung around a person's neck. To place the glasses on, and secure them to, the head, a closure is secured at the appropriate length of the strap. In the simplest case, the strap can also be shortened to any length by knotting it.

Pursuant to a further embodiment of the present invention, the eyeglasses or lenses can be exchangeable in order to be able to insert glasses of different color and/or strength. For this purpose, the central frame portion has a limited elasticity in the region of the groove-like recesses for the lenses, so that by exerting a certain amount of pressure on them, the lenses spring out of the frame and can then be replaced by other lenses. This embodiment additionally serves to avoid the danger of injury, such as in the past frequently occurred when the glasses received a strong blow, resulting in injuries from cuts due to the rigidity of the frame and lens system.

If the central frame portion and well as the temple pieces are transparent, the inventive eyeglass frame has the additional advantage that the field of vision is not restricted by hinges or other non-transparent components.

Further specific features of the present invention will be described in detail subsequently.

DESCRIPTION OF PREFERRED EMBODIMENTS

Referring now to the drawings in detail, the central frame portion 1 illustrated in FIG. 1 has the same shape as do heretofore known eyeglass frames. The central portion 1 comprises two parts that are adapted to the desired lens shape, and that are interconnected by a central crosspiece. Respective elongated holes or slots 4 are provided in each of the side regions of this central frame portion 1.

Figure 2:
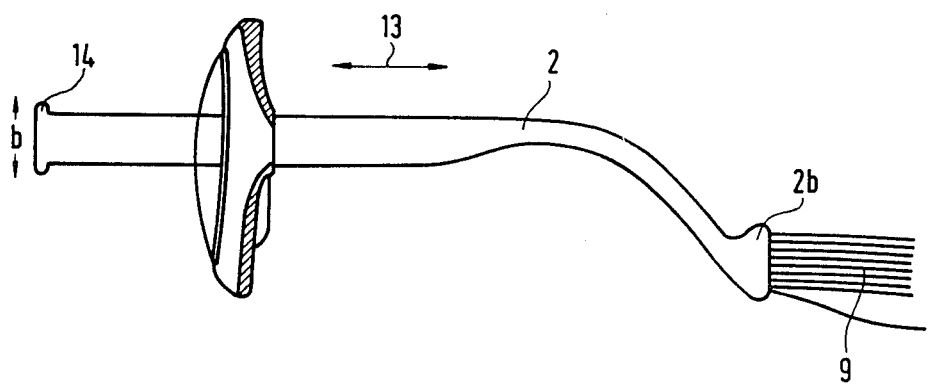
FIG. 2 is a side view of the central frame portion, with a temple piece having been inserted therethrough.

As shown in FIG. 2, the sidepieces or temple pieces 2 can be guided through these slots 4 at right angles to the central portion 1, in the direction of movement indicated by the double arrow 13, until the widened portion 14 comes to rest against the edge 5 that extends around the slot 4. In the illustrated embodiment, a shaft-like temple piece 2 is used that has an oval cross-sectional shape. Disposed on the end of this temple piece 2 is a widened portion 14 that has a corresponding cross-sectional shape with a width "b" and a greater surface measurement. If temple pieces are used having an essentially circular cross-sectional shape, the widened portion can be spherical, as indicated in the embodiment of FIG. 4.

Figure 3:
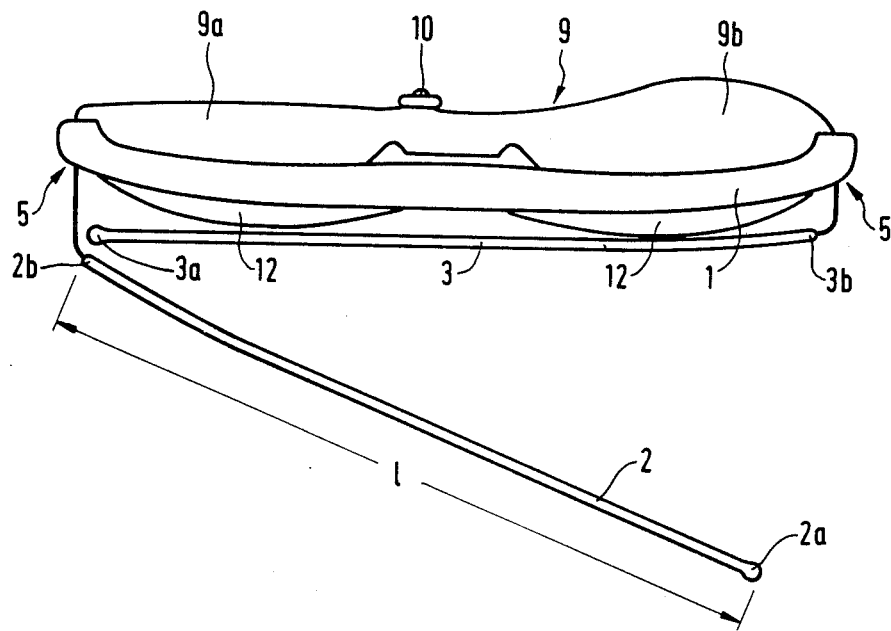
FIG. 3 is a plan view of one exemplary embodiment of the inventive frame being used for sport glasses, with a rubber strap being secured to those ends of the temple pieces that fit about the ears.

As shown in FIGS. 2 and 3, that end 2b or 3b of the temple piece 2 or 3 that is adapted to fit about an ear is connected to a one or two-piece, flexible carrying or support band or strap 9, for example of rubber or elastic material.

FIG. 3 shows one exemplary embodiment of the present invention in a folded-up state. The temple pieces 2 and 3 rest against, or can be applied or engaged against, the front side of the central frame portion 1, with the rubber strap being passed through the holes or slots 4 at both ends. The illustrated support strap 9 comprises two parts 9a and 9b that are interconnected by a push-button or snap fastener 10.

Figure 4:
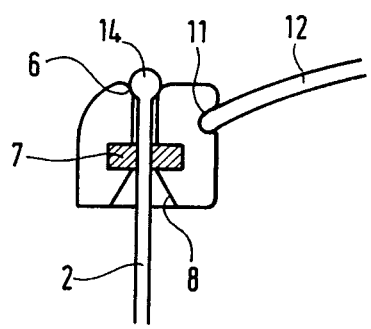
FIG. 4 is a cross-sectional view through one side region of an exemplary embodiment of the central portion of the inventive frames.

In the cross-sectional view illustrated in FIG. 4, a reinforcement 7 is provided that is disposed within the central frame portion 1. In the most straightforward situation, the reinforcement 7 comprises a circular ring having an inner diameter that corresponds to the slightly smaller circular cross-sectional shape of the temple piece. On the front side of the central frame portion 1, the holes 4 are each provided with groove-like recesses 6 which in the illustrated embodiment are adapted to the spherical widened portions 14 of the temple pieces 2. On that side of the reinforcement ring 7 facing the back side o the central frame portion 1, each hole 4 is provided with a conical enlargement 8. The lens or eyeglass 12 rests in a groove-like recess that is provided with support surfaces 11 which have a limit ed elasticity, thus making it possible to remove and exchange the lenses by pressing on them hard with the fingers.

As an alternative, it is also possible to provide the groove-like recess 6 directly ahead of the reinforcement 7, so that the widened portion 14 has to overcome the resulting narrow location at the front of the central frame portion 1 before it can snap into the groove-like recess 6.

Unfolding of the glasses, starting from the position of the temple pieces illustrated in the drawing, can be effected in a simple manner by pulling the strap 9 in a direction away from the central frame portion 1, so that those ends 2b and 3b of the temple pieces that are near the slots 4 slide into the latter and the length "1" of the temple pieces 2, 3 are guided through the slots 4 until the widened portions 14 either come to rest against the edges 5 that extend around the slots 4, or snap into the groove-like recesses 6.

The present invention is, of course, in no way restricted to the specific disclosure of the specification and drawings, but also encompasses any modifications within the scope of the appended claims.

What I claim is:

1. In an eyeglass frame, especially for sport glasses, including a central portion for accommodating lenses, as well as temple pieces that can be detached from said central portion, where each of said temple pieces can be inserted through a receiving means, in the form of a respective hole or slot, provided in each side region of said central frame portion, the improvement therewith comprising:

each of said temple pieces has a first end that is provided with a widened portion that is adapted to come to rest against said central frame portion in the vicinity of a given one of said receiving means thereof, with the entire length of each of said temple pieces being adapted to be guided into an operative position via a sliding motion accompanying a snap movement through a given one of said receiving means until termination of the snap movement occurs via engagement of said temple pieces with respect to said central frame portion in the operative position due to a snap-click connection therebetween.

2. An eyeglass frame according to claim 1, in which each of said receiving means in said central frame portion has an edge that extends around that receiving means, with a given one of said widened portions being adapted to rest loosely against a given one of said edges.

3. An eyeglass frame according to claim 1, in which said central frame portion is provided with respective groove-like recess means in the vicinity of, and in communication with, each of said receiving means for receiving therein, with a snap-fit, a given one of said widened portions of said temple pieces, said temple pieces comprising snap means for sliding said temple pieces through said receiving means by pulling said snap means from said central frame portion, with said snap means comprising means for click engaging said widened portions within said receiving means, and abruptly stopping therewith said sliding motion when pulling said snap means.

4. An eyeglass frame according to claim 1, in which each of said temple pieces is essentially rigid.

5. An eyeglass frame according to claim 1, in which each of said widened portions has a spherical or elongated-oval cross-sectional shape with a width that is greater than the width of the remainder of said temple piece and of said receiving means.

6. An eyeglass frame according to claim 1, in which in each of said receiving means, within said central frame portion, there is disposed a ring-like or elongated oval reinforcement that is made of a material which is harder than the material of said central frame portion, with said reinforcement having an opening for receiving a temple piece, said opening being of such a size as to prevent said widened portion of that temple piece from sliding through upon expansion of the pertaining receiving means.

7. An eyeglass frame according to claim 1, in which that side of a given receiving means that would be directed toward the face of a wearer when the frame is worn is conically enlarged.

8. An eyeglass frame according to claim 1 in which said central frame portion has a slight elasticity in the vicinity of each one of said receiving means.

9. An eyeglass frame according to claim 1, in which each of said temple pieces has a second end, remote from said first end thereof, that is adapted to fit about an ear of a person wearing the frame, with each of said second ends being connected or connectable to a flexible one or two-piece support strap.

10. An eyeglass frame according to claim 9, in which said strap is a two-piece strap, with each of said pieces being connected or connectable to one of said second ends of said temple pieces; and which includes securing means for connecting said strap pieces together.

11. An eyeglass frame according to claim 10, in which said securing means is a snap fastener, a clip, or an adhesion fastener.

12. An eyeglass frame according to claim 9, in which said support strap is integrally formed with said second ends of said temple pieces.

13. An eyeglass frame according to claim 1, in which said central frame portion is provided with groove-like recesses, with support surfaces that have a given elasticity, for receiving eyeglass lenses.

14. An eyeglass frame according to claim 1, in which said central frame portion and/or said temple pieces are transparent.

* * * * *